(12) United States Patent  
Hamalainen et al.

(10) Patent No.: US 10,772,042 B2  
(45) Date of Patent: Sep. 8, 2020

(54) REDUCING INTERFERENCE AND ENERGY CONSUMPTION FOR FEMTO BASE STATIONS

(75) Inventors: Seppo Olavi Hamalainen, Espoo (FI); Haitao Tang, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 187 days.

(21) Appl. No.: 13/128,165

(22) PCT Filed: Oct. 16, 2009

(86) PCT No.: PCT/EP2009/063555  
§ 371 (c)(1),  
(2), (4) Date: May 6, 2011

(87) PCT Pub. No.: WO2010/052112  
PCT Pub. Date: May 14, 2010

(65) Prior Publication Data  
US 2011/0211514 A1  Sep. 1, 2011

(30) Foreign Application Priority Data

Nov. 7, 2008  (EP) .................................. 08019533

(51) Int. Cl.
| | | |
|---|---|---|
| *G08C 17/00* | (2006.01) | |
| *H04W 52/02* | (2009.01) | |
| *H04W 84/10* | (2009.01) | |

(52) U.S. Cl.  
CPC ... *H04W 52/0232* (2013.01); *H04W 52/0206* (2013.01); *H04W 84/105* (2013.01);  
(Continued)

(58) Field of Classification Search  
CPC ......... H04W 52/0232; H04W 52/0206; H04W 84/105; Y02B 60/50; Y02D 70/146;  
(Continued)

(56) References Cited

U.S. PATENT DOCUMENTS

| | | | |
|---|---|---|---|
| 5,414,750 A | * | 5/1995 | Bhagat et al. ................ 455/416 |
| 6,347,226 B1 | | 2/2002 | Virtanen ....................... 455/450 |

(Continued)

FOREIGN PATENT DOCUMENTS

| | | |
|---|---|---|
| EP | 2 056 628 A1 | 5/2009 |
| WO | WO 98/26614 | 6/1998 |

(Continued)

OTHER PUBLICATIONS

Alcatel-Lucent, Solution for interference reduction SON use case, May 5-9, 2008.*

(Continued)

*Primary Examiner* — Mang Hang Yeung  
(74) *Attorney, Agent, or Firm* — Harrington & Smith

(57) ABSTRACT

The present invention relates to methods, apparatuses, a system and a computer program product for reducing interference and energy consumption of wireless devices. An apparatus, namely a femto base station or home (e) NodeB, can include a transmitting unit, a receiving unit, a determining unit, a disabling unit, a disabling handshaking unit, and a reassigning unit. If the determining unit determines that there is no active communication between the apparatus and a user device, the disabling unit may disable the transmitting unit and the receiving unit while maintaining a connection between the apparatus and a network. A disabling handshaking can be performed by the disabling handshaking unit to achieve this, wherein the re-assigning unit may re-assign one or more user device(s) to a network apparatus, namely a macro (e) NodeB.

18 Claims, 4 Drawing Sheets

---

S101 determining whether there is an active communication between an apparatus and a user device

S102 disabling transmitting means and receiving means of the apparatus while maintaining a connection between the apparatus and a network, if there is no active communication between the apparatus and the user device

(52) U.S. Cl.
CPC ...... *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/21* (2018.01)

(58) Field of Classification Search
CPC .......... Y02D 70/1262; Y02D 70/1264; Y02D 70/21; Y02D 70/142; Y02D 70/144
USPC ............................... 370/311; 340/7.32–7.38; 455/343.1–343.6
See application file for complete search history.

(56) References Cited

U.S. PATENT DOCUMENTS

| | | | | |
|---|---|---|---|---|
| 6,360,106 | B1* | 3/2002 | Besson | 455/561 |
| 6,584,330 | B1* | 6/2003 | Ruuska | 455/574 |
| 2003/0134648 | A1* | 7/2003 | Reed | H04W 60/00 455/456.1 |
| 2006/0140135 | A1* | 6/2006 | Bonta et al. | 370/254 |
| 2007/0248064 | A1* | 10/2007 | Shaheen | H04W 60/04 370/338 |
| 2008/0107063 | A1* | 5/2008 | Oleszczuk | H04W 16/10 370/315 |
| 2010/0208696 | A1* | 8/2010 | Lee | H04W 36/0055 370/331 |
| 2010/0215020 | A1* | 8/2010 | Lee | H04L 1/1614 370/331 |

FOREIGN PATENT DOCUMENTS

| | | |
|---|---|---|
| WO | WO 2004/075583 A1 | 9/2004 |
| WO | WO 2005/120101 A1 | 12/2005 |

OTHER PUBLICATIONS

Feng, S., et al., "Self-Organizing Networks (SON) in 3GPP Long term Evolution", NOMOR Research GmbH, May 20, 2008, 15 pgs.

* cited by examiner

REDUCING INTERFERENCE AND ENERGY CONSUMPTION FOR FEMTO BASE STATIONS

FIELD OF THE INVENTION

The present invention relates to methods, apparatuses, a computer program product and a system for reducing interference and energy consumption of wireless devices.

BACKGROUND OF THE INVENTION

Due to the global warming problem every organization has to improve power efficiency. Therefore, energy saving or power optimization is one of the key self-organized networks (SON) use cases in 3rd generation partnership project (3GPP) and next generation mobile networks (NGMN). The use case is about changing network parameters during operational state so that energy consumption of network elements would be minimized and therefore operating or operational expenditure (OPEX) saving (through lower electricity bill) and environmental benefits (less CO2 emission due to lower energy consumption) would be achieved.

In case of a (femto) home node B (HNB), the energy saving or power optimization can solve another more significant problem that becomes more acute when the number of HNBs increases in a given residential area. The problem is that the downlink (DL) transmission of a femto base station generates interference to other neighboring femto cell users and the non-femto users that are connected to an overlay macro cell base station. Minimizing interference caused by femto nodes is essential even just for the normal operation of the networks.

The deployment of HNBs and home enhanced node Bs (HeNBs) is usually performed in an uncoordinated manner, which can lead to a decreased macro and femto network capacity due to increased inter-cell interference. In addition, active H(e)NBs consume energy and generate interference even if there is no traffic, as there may be long periods during which all allowed user equipments (UEs) are outside the cell coverage (working hours, school hours, holidays, outdoor activities, etc.). Thus, it would be advantageous to activate/deactivate H(e)NBs, depending on authorized UEs' locations, in order to reduce energy consumption and interference.

One way to achieve energy saving and interference reduction is to shut down an entire femto cell, which may provide the most gain and the most straightforward approach. For example, a person operating a H(e)NB can switch off the same or disconnect the power line cable thereof when leaving his/her residence or office where the H(e)NB is located. Another way is to switch on or off a H(e)NB when an authorized UE arrives at or leaves the vicinity of the access point formed by the H(e)NB. Such approach is described e.g. in R3-081174, "Solution for interference reduction SON use case", Orange, Alcatel-Lucent, RAN3#61bis ([R3-081174]) and R3-081123, "Dynamic Setup of HNBs for Energy Savings and Interference Reduction", Mitsubishi Electric, RAN3#60 ([R3-081123]).

With the previously proposed approaches as described above, the H(e)NB still generates interference and consumes electricity even if no active sessions are created, e.g. during night time when an authorized UE is located in the H(e)NB area but does not make any calls. The previously proposed approaches do not solve the more important interference problem directly. If they provide some solution to this problem at all, it is not effective.

SUMMARY OF SOME EXAMPLES OF THE INVENTION

It is an object of the present invention to provide an improved mechanism for reducing interference and energy consumption of wireless devices.

This object can be achieved at a first transmission end by a method comprising:
  determining whether there is an active communication between an apparatus and a user device; and
  disabling transmitting means and receiving means of the apparatus while maintaining a connection between the apparatus and a network, if there is no active communication between the apparatus and the user device.

Furthermore, at a second transmission end the above object may be achieved by a method comprising:
  receiving a setup request; and
  performing an enabling handshaking between a network and an apparatus,
  wherein transmitting means and receiving means of the apparatus are enabled after successful completion of the enabling handshaking.

Moreover, at the first transmission end the above object can be achieved by an apparatus comprising:
  transmitting means for transmitting a wireless communication signal;
  receiving means for receiving a wireless communication signal;
  determining means for determining whether there is an active communication between the apparatus and a user device; and
  disabling means for disabling the transmitting means and the receiving means while maintaining a connection between the apparatus and a network, if there is no active communication between the apparatus and the user device.

In addition, at the second transmission end the above object can be achieved by an apparatus comprising:
  receiving means for receiving a setup request via a network apparatus; and
  enabling handshaking means for performing an enabling handshaking between the apparatus and a further apparatus,
  wherein transmitting means and receiving means of the further apparatus are enabled after successful completion of the enabling handshaking.

The above methods may be implemented as a computer program product comprising code means for performing the respective above steps when run on a computer device.

The above apparatuses may be implemented as network elements or nodes such as e.g. a mobility management entity (MME) or HNB gateway, access devices such as e.g. H(e)NBs or other base stations, or as modules, chips, chip sets or chip devices provided in these elements, nodes or devices.

Accordingly, a mechanism can be provided that enables to reduce the interference and energy consumption. A femto base station such as e.g. a H(e)NB can always be kept in an inactive state when there are no active ongoing sessions. This may result in an improved energy efficiency as well as less interference to macro cell and neighboring femto cell users.

The proposed mechanism can provide longer inactive periods and therefore improved energy efficiency and less interference in comparison with previous approaches such as described e.g. in [R3-081174] and [R3-081123]. Further, there is no need to use an infrared data association (IrDA) or Bluetooth (BT) interface to transmit a wake-up signal to an inactive femto base station as proposed in earlier 3GPP contributions such as e.g. [R3-081123].

Further advantageous modifications are defined in the dependent claims.

The above examples are intended to be merely exemplary and should not be construed as limiting in any way.

BRIEF DESCRIPTION OF THE DRAWINGS

The present invention will now be described based on embodiments with reference to the accompanying drawings, in which.

DESCRIPTION OF EXEMPLARY EMBODIMENTS

Figure 1:
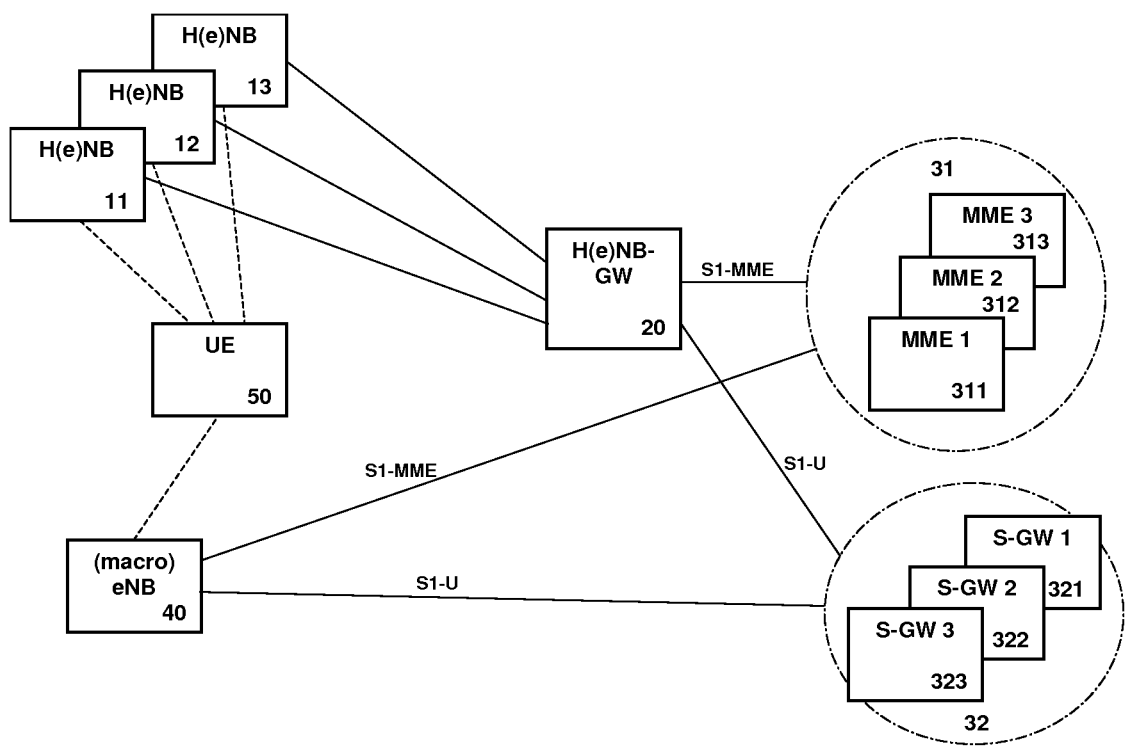
FIG. 1 shows a schematic diagram of an exemplary network architecture in which the exemplary embodiments can be implemented.

FIG. 1 shows a schematic diagram of an exemplary network architecture in which the exemplary embodiments can be implemented.

As depicted in FIG. 1, several home (enhanced) node Bs (H(e)NBs) 11 to 13 can be provided in a home environment, e.g. within a building, and connected to a H(e)NB gateway (node) (H(e)NB-GW) 20. The H(e)NB-GW 20 may provide a connection via an S1-MME reference point to a pool 31 of mobility management entities (MMEs) 311 to 313 and via an S1-U reference point to a pool 32 of signaling gateways (S-GWs) 321 to 323. Both MME and S-GW pools 31 and 32 can provide connections to a macro eNB 40 which serves a macro cell in or under which the H(e)NBs 11 to 13 are located. A user equipment (UE) 50 may be served by the eNB 40 or one of the H(e)NBs 11 to 13, i.e. a macro base station or a femto base station.

While an arrangement comprising an eNB is shown in FIG. 1, this is only one example of a network according to 3rd generation partnership project (3GPP) long-term evolution (LTE) or LTE advanced (LTE-A) in which the exemplary embodiments can be implemented. Other kinds of networks employing macro base stations serving respective macro cells and femto base stations serving respective femto cells are possible. For example, a WiFi access point (AP) case may be considered, where an overlay macro network such as e.g. an enhanced data rates for global system for mobile communications (GSM) evolution (EDGE) network, a wideband code division multiple access (WCDMA) network, a LTE network or a worldwide interoperability for microwave access (WiMAX) network comprises macro cells and a wireless local area network (WLAN) AP serves a femto cell.

Figure 2:
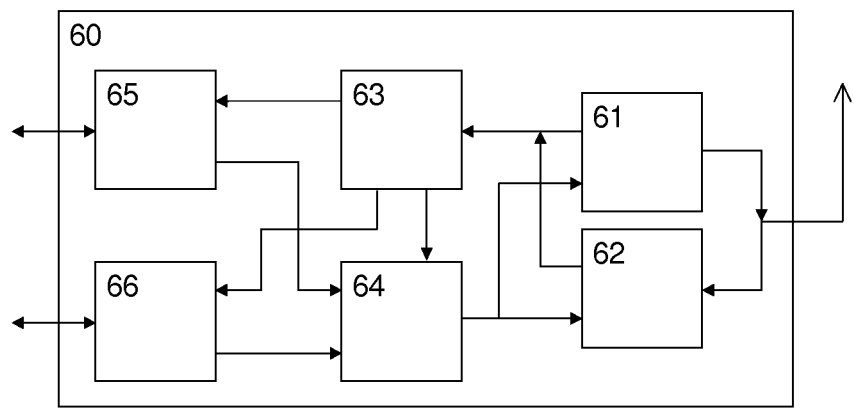
FIG. 2 shows a schematic block diagram of an apparatus such as e.g. a femto base station according to the exemplary embodiments.

FIG. 2 shows a schematic block diagram of an apparatus 60 such as e.g. a femto base station according to the exemplary embodiments. For example, the apparatus 60 may be a H(e)NB such as e.g. one of the H(e)NBs 11 to 13 depicted in FIG. 1. The apparatus 60 can not only be implemented in this form but also e.g. as a network element or node, an access device etc., or as modules, chips, chip sets or chip devices provided in such element, node or device.

The apparatus 60 may comprise a transmitting unit or means 61, a receiving unit or means 62, a determining unit or means 63, a disabling/enabling unit or means 64, a disabling/enabling handshaking unit or means 65, and a re-assigning unit or means 66. The transmitting unit 61 can transmit a wireless communication signal via an antenna, the receiving unit 62 may receive a wireless communication signal via the antenna, the determining unit 63 can determine whether there is an active communication between the apparatus 60 and a user device such as e.g. the UE 50 depicted in FIG. 1, the disabling/enabling unit 64 may disable/enable the transmitting unit 61 and the receiving unit 62, the disabling/enabling handshaking unit 65 can perform a disabling/enabling handshaking, and the re-assigning unit 66 may re-assign a user device such as the UE 50 to a network apparatus such as e.g. the eNB 40 depicted in FIG. 1. The functionality of these components is described in further detail below.

All or part of the above components can be integrated in a single component, even if they are represented by separate blocks in FIG. 2. For example, the transmitting unit 61 and the receiving unit 62 can be integrated in a transceiver, the determining unit 63, the disabling/enabling unit 64, the disabling/enabling handshaking unit 65 and the re-assigning unit 66 may be integrated in a processor or controller, and all of the components can be integrated in a single module or chip. On the other hand, each of the disabling/enabling unit 64 and the disabling/enabling handshaking unit 65 may be implemented by separate components, while they are represented by a respective single block in FIG. 2 for the sake of clarity. That is, there can be a disabling unit or means, an enabling unit or means, a disabling handshaking unit or means, and an enabling handshaking unit or means. Further, the apparatus 60 may comprise additional components not depicted in FIG. 2. For example, it can include a storing unit such as e.g. a memory for storing information such as e.g. information received by the receiving unit 62. Moreover, part of the components or corresponding components may be located in a separate apparatus. For example, a re-assigning unit 74 corresponding to the re-assigning unit 66 can be located in a MME such as e.g. one of the MMEs 311 to 313 depicted in FIG. 1.

Figure 3:
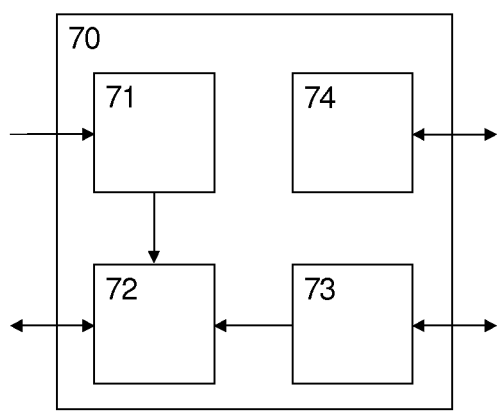
FIG. 3 shows a schematic block diagram of an apparatus such as e.g. a network entity according to the exemplary embodiments.

FIG. 3 shows a schematic block diagram of an apparatus 70 such as e.g. a network entity according to the exemplary embodiments. For example, the apparatus 70 may be a MME such as e.g. one of the MMEs 311 to 313 depicted in FIG. 1. The apparatus 70 can not only be implemented in this form but also e.g. as a network element or node, an access device etc., or as modules, chips, chip sets or chip devices provided in such element, node or device.

The apparatus 70 may comprise a receiving unit or means 71, an enabling handshaking unit or means 72, and a checking unit or means 73. The receiving unit 71 can receive a wired or wireless signal comprising e.g. a setup request, the enabling handshaking unit 72 may perform an enabling handshaking, and the checking unit 73 can check whether an apparatus is located in a coverage area of a network apparatus. The functionality of these components is described in further detail below. All or part of the components may be integrated in a single component, even if they are represented by separate blocks in FIG. 3. Further, the apparatus 70 can comprise additional components not depicted in FIG. 3. For example, it may include a storing unit such as e.g. a memory for storing received information such as e.g. a setup request received by the receiving unit 71.

According to the exemplary embodiments, a concept enabling to reduce interference and energy consumption is introduced. This concept is described in more detail below, with reference to the exemplary case of the apparatus 60 being a H(e)NB, the apparatus 70 being a network entity such as e.g. a MME, and the macro base station being a (e)NB. However, there are other options for these devices as mentioned above. Thus, the following description is not to be construed as restrictive in any way.

According to a first exemplary embodiment, when there is not any active data session in the H(e)NB 60, the H(e)NB 60 can trigger a go-hot-standby procedure and go into hot standby. That is, the H(e)NB's cell may be turned off while it can maintain its connection with a network of an associated macro base station serving a macro cell, such as e.g. the eNB 40 or another macro NB. For example, the H(e)NB 60 may still be connected to a MME of the network, so that it can receive a wake-up signaling indicating that it should be activated. Alternatively, the H(e)NB 60 may also be connected to a femto gateway such as e.g. the H(e)NB-GW 20, or can be connected to a MME (e.g. one of the MMEs 311 to 313) through such femto gateway. The determining unit 63 may determine whether there is an active communication between the H(e)NB 60 and a user device such as e.g. the UE 50, with reference to the transmitting unit 61 and the receiving unit 62. If the determining unit 63 determines that there is no active communication, the disabling/enabling unit 64 can disable the transmitting unit 61 and the receiving unit 62, wherein a connection between the H(e)NB 60 and the network may be maintained. That is, only a radio frequency (RF) section can be switched off while transport and processing may be kept active (i.e., the so-called hot standby). This can be achieved by means of the disabling/enabling handshaking unit 65 that may perform a disabling handshaking between the H(e)NB 60 and the macro (e)NB's network, for example a network entity such as e.g. a MME.

Thus, the deactivation as well as the below described activation of the H(e)NB 60 can be done through handshakes between an entity in the macro (e)NB's network and the H(e)NB 60. To enable the handshakes, there may be pre-configurations at the H(e)NB 60 and at the macro (e)NB's network. The pre-configurations can provide both sides with the needed associations, including the security associations.

If there is not any active data session in the H(e)NB 60, the H(e)NB 60 may start a go-hot-standby procedure, which can include the graceful re-camping of its UEs (if any) to a neighboring macro (e)NB and handshaking with the macro (e)NB's network for the agreed hot standby. When the go-hot-standby procedure completes successfully, the H(e)NB 60 may go into hot standby (the H(e)NB's 60 cell turned off while it maintains its connection with the macro (e)NB's network).

That is, the disabling/enabling handshaking unit 65 can be used to perform a disabling handshaking between the H(e)NB 60 and the macro (e)NB's network. Further, the re-assigning unit 66 may re-assign UEs assigned to the H(e)NB 60, if any, to the macro (e)NB in a coverage area of which the H(e)NB 60 is located. When the disabling handshaking and/or the re-assignment of UEs to the macro (e)NB have been completed successfully, the disabling/enabling unit 64 can disable the transmitting unit 61 and the receiving unit 62.

That is, the H(e)NB 60 is in hot standby (its cell is switched off while its connection with an operator is on), and it's cell may be switched on again by using the available multi-access capability, only when there is a need to set up an active connection. This is described in more detail in the following.

According to the first exemplary embodiment, a UE such as e.g. the UE 50 needs to set up an active session. It can make a random access channel (RACH) attempt (for a mobile terminated call (MTC) there is a RACH attempt after paging) in an adjacent macro cell, i.e. transmit a RACH message or burst to a closest macro base station. Then, a femto base station such as e.g. the H(e)NB 60 may become active and the connection can be redirected to the H(e)B 60 (granularity is the tracking area).

The H(e)NB 60 can be associated with a number of UEs including the UE 50, i.e. a group of UEs that belong to the so-called closed subscriber group (CSG) of the H(e)NB 60. If any one of the H(e)NB's CSG users is in area and has an active session, the H(e)NB 60 may be activated. Hence, if the H(e)NB 60 is located within the coverage area of the macro base station in question such as a macro (e)NB, the network can trigger an activation signaling to the hot standby H(e)NB 60. Thus, the activation handshaking between the H(e)NB 60 and the macro (e)NB's network may start. Then, the H(e)NB 60 can be activated into active service mode. That is, the checking unit 73 may check whether the H(e)NB 60 is located within the coverage area of the associated macro base station. If the check is affirmative, the enabling handshaking unit 72 can perform an enabling handshaking between the network and the H(e)NB 60, wherein the disabling/enabling handshaking unit 65 may participate in this enabling handshaking. After successful completion of the enabling handshaking, the disabling/enabling unit 64 may enable the transmitting unit 61 and the receiving unit 62. The UE 50 may then notice the activated H(e)NB 60, and the UE/the network can consider if it needs to hand over from the macro (e)NB to the H(e)NB 60 or not. Here, the UE 50 can be paged through the macro (e)NB if the UE 50 makes a handover to the H(e)NB 60 when its activation is ready, or the network may wait until the activation is ready and then page the UE 50 through the H(e)NB 60.

If the UE 50 is not in the area of such macro base station that covers its H(e)NB 60, its H(e)NB 60 is not activated during e.g. a RACH attempt, paging, a coming session setup request, etc. However, if the UE 50 moves and makes a hand over to a macro (e)NB under which the serving femto cell is located, the activation of the H(e)NB 60 can be triggered. Thus, in this case the hand over may act as a trigger for the activation.

According to a second exemplary embodiment, the deactivation procedure can be similar to the one described above. Thus, a detailed description thereof is omitted.

In the second exemplary embodiment, the activation procedure may be initiated by a session setup request coming from a caller to the UE 50 (as the callee) over the macro (e)NB's network. The macro (e)NB's network can check if any of the UE's H(e)NB(s) in hot standby such as e.g. the H(e)NB 60 is within the coverage of any of the network's relevant macro (e)NBs. If yes, the network may trigger the activation signaling to the hot standby H(e)NB (s). Thus, similar to the first exemplary embodiment the network can trigger the activation signaling to the relevant hot standby H(e)NB when there is a call towards the UE 50. The activation handshaking between the H(e)NB and the macro (e)NB's network can start. Then, the H(e)NB may be activated into active service mode. That is, the checking unit 73 may check whether any of the UE's H(e)NB(s) is located within the coverage area of any of the network's relevant macro base stations. If the check is affirmative, the enabling handshaking unit 72 can perform an enabling handshaking between the network and the H(e)NB(s), wherein the disabling/enabling handshaking unit 65 of the respective H(e)NB 60 may participate in this enabling handshaking. After successful completion of the enabling handshaking, the disabling/enabling unit 64 may enable the transmitting unit 61 and the receiving unit 62. The UE 50 can then notice the activated H(e)NB 60, and the UE/the network may consider if it needs to hand over from the macro (e)NB to the H(e)NB 60 or not. Here, the UE 50 can be paged through the macro (e)NB if the UE 50 makes a handover to the H(e)NB 60 when its activation is ready, or the network may wait until the activation is ready and then page the UE 50 through the H(e)NB 60.

If the UE 50 is not in the area of such macro base station that covers its H(e)NB 60, its H(e)NB 60 is not activated during e.g. a RACH attempt, paging, a coming session setup request, etc. However, if the UE 50 moves and makes a hand over to a macro (e)NB under which the serving femto cell is located, the activation of the H(e)NB 60 can be triggered. Thus, in this case the hand over may act as a trigger for the activation.

In the above described exemplary embodiments, the H(e)NB 60 can go into hot standby when 1) the UE 50 leaves the coverage area of the macro (e)NB (with active connection), 2) an active connection is terminated, i.e. the UE 50 enters an idle mode, 3) no traffic is transmitted over a predefined period.

Figure 4:
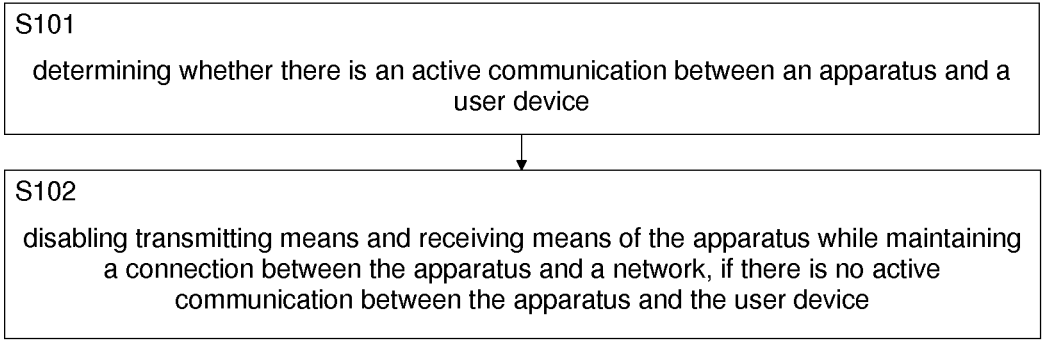
FIG. 4 shows a flow diagram of a basic processing at an apparatus such as e.g. a femto base station according to the exemplary embodiments.

FIG. 4 shows a flow diagram of a basic processing at an apparatus such as e.g. a femto base station according to the exemplary embodiments. In a step S101, it can be determined whether there is an active communication between an apparatus and a user device. In a step S102, transmitting means and receiving means of the apparatus may be disabled while a connection between the apparatus and a network can be maintained, if there is no active communication between the apparatus and the user device.

Figure 5:
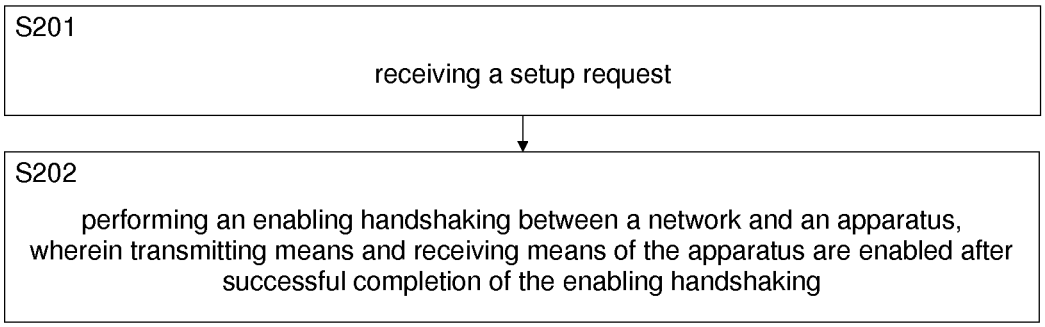
FIG. 5 shows a flow diagram of a basic processing at an apparatus such as e.g. a network entity according to the exemplary embodiments.

FIG. 5 shows a flow diagram of a basic processing at an apparatus such as e.g. a network entity according to the exemplary embodiments. In a step S201, a setup request may be received. In a step S202, an enabling handshaking between a network and an apparatus can be performed, wherein transmitting means and receiving means of the apparatus may be enabled after successful completion of the enabling handshaking.

Figure 6:
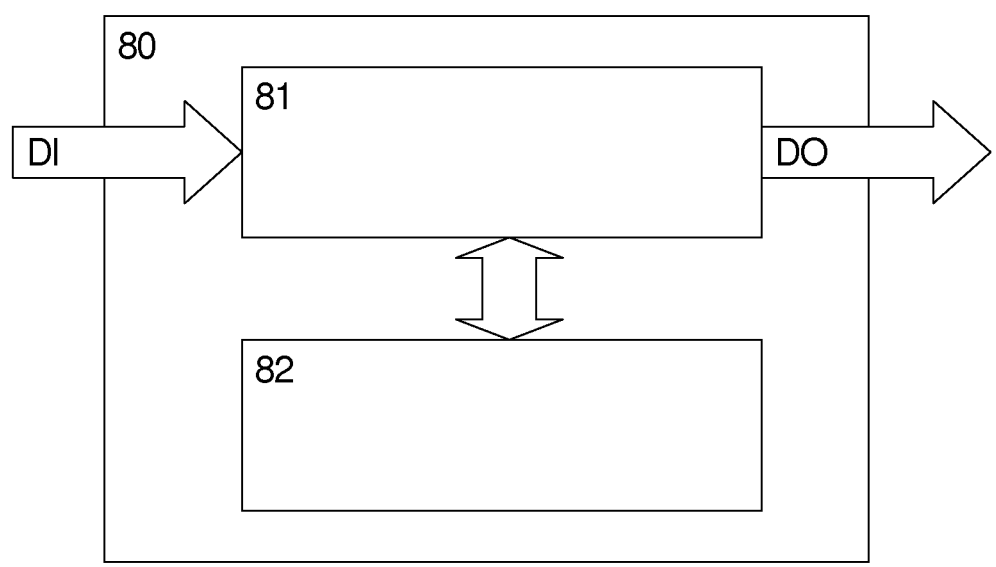
FIG. 6 shows a schematic block diagram of a software-based implementation of the exemplary embodiments.

FIG. 6 shows a schematic block diagram of a software-based implementation of the exemplary embodiments. The required functionalities can be implemented in a processing unit 80, which may be any processor or computer device with a control unit 81 that performs control based on software routines of a control program stored in a memory 82. The control program may also be stored separately on a computer-readable medium. Program code instructions can be fetched from the memory 82 and loaded into the control unit 81 of the processing unit 80 in order to perform the processing steps of the above functionalities of the embodiments, which may be implemented as the above-mentioned software routines. The processing steps can be performed on the basis of input data DI and may generate output data DO. The input data DI may correspond e.g. to an activation information indicating that disabled transmitting and receiving units of an apparatus such as e.g. the transmitting unit 61 and the receiving unit 62 of the apparatus 60 should be enabled. The output data DO can correspond e.g. to re-assignment information from the re-assigning unit 66.

Thus, the above exemplary embodiments may be implemented as a computer program product comprising code means for performing each individual processing step when run on a computer device or data processor of the apparatus 60 or the apparatus 70.

The concept described above enables a femto base station to power off its transceivers when its owner is not at home, while being in hot standby and connected to the core network. When a user makes a RACH attempt (for a MTC there is a RACH attempt after paging) in an adjacent macro cell, the femto base station can power on its transceivers, i.e. become active again. Then, the connection may be redirected to the femto base station.

Accordingly, a mechanism can be provided that enables to reduce interference and energy consumption. A femto base station such as e.g. a H(e)NB can always be kept in an inactive state when there are no active ongoing sessions. This may result in an improved energy efficiency as well as less interference to macro cell and neighboring femto cell users.

The proposed mechanism can provide longer inactive periods and therefore improved energy efficiency and less interference in comparison with previous approaches such as described e.g. in [R3-081174] and [R3-081123]. The reduced energy consumption may result in a reduced OPEX and an improved eco-balance. Further, there is no need to use an IrDA or BT interface to transmit a wake-up signal to an inactive femto base station as proposed in earlier 3GPP contributions such as e.g. [R3-081123]. That is, a simpler wake-up procedure can be implemented.

The above exemplary embodiments are described with reference to a macro (e)NB as one example of a macro base station and a H(e)NB as one example of a femto base station. As mentioned above, the proposed mechanism can also be applied to other macro and femto base stations. For example, base stations of an EDGE network, a WCDMA network, a LTE network or a WiMAX network may act as macro base stations, and a WLAN AP can act as a femto base station.

It is apparent that the present invention can easily be extended to any communication system employing some kind of femto cells. Specifically, the present invention is not intended to be restricted to the described communication technologies. The embodiments may thus vary within the scope of the attached claims. Furthermore, while the embodiments have been described mainly for the case of an apparatus 60 and an apparatus 70, other devices can take the respective role as well.

In summary, the present invention relates to methods, apparatuses, a system and a computer program product for reducing interference and energy consumption of wireless devices. An apparatus 60 can comprise a transmitting unit 61, a receiving unit 62, a determining unit 63, a disabling unit 64, a disabling handshaking unit 65, and a re-assigning unit 66. If the determining unit 63 determines that there is no active communication between the apparatus 60 and a user device, the disabling unit 64 may disable the transmitting unit 61 and the receiving unit 62 while maintaining a connection between the apparatus 60 and a network. A disabling handshaking can be performed by the disabling handshaking unit 65 to achieve this, wherein the re-assigning unit 66 may re-assign one or more user device(s) to a network apparatus.

The invention claimed is:

1. A method comprising:
   determining, by a base station in a wireless communications network, whether there is an active wireless communication data session, based on wireless transmission and reception of the base station, between the base station and a user device while the user device is assigned to the base station;
   in response to determining no active wireless communication data session between the base station and the user device while the user device is assigned to the base station, disabling wireless transmission and wireless reception of the base station while maintaining a connection between the base station and a node of the wireless communications network,
   wherein the determination of no active wireless data session comprises at least one of the user device having left the coverage area of the base station, the active wireless session has been terminated, and no traffic is transmitted over a predefined period,
   receiving, by the base station in the wireless communications network, a setup request;
   performing an enabling handshaking between said node of the wireless communications network and the base station, wherein the wireless communications network connects at least one neighboring base station and the base station enabling a user device associated with the base station and/or the at least one neighboring base station to be able to be reassigned between the base station and the at least one neighboring base station, and
   in response to successful completion of said enabling handshaking, enabling wireless transmission and wireless reception of the base station, wherein the base station is located in a coverage area of the at least one neighboring base station,
   wherein said setup request is received via the at least one neighboring base station from the user device associated with the base station.

2. The method according to claim 1, further comprising:
   performing a disabling handshaking between the base station and the node of the wireless communications network.

3. The method according to claim 2, wherein
   after successful completion of said disabling handshaking and/or said re-assignment, disabling wireless transmission and wireless reception of the base station.

4. The method according to claim 1, further comprising:
   re-assigning at least one user device assigned to the base station to the at least one neighboring base station which has a coverage area in which the base station is located.

5. The method of claim 1, wherein a wireless local area network access point serves a cell of the base station.

6. A method comprising:
   receiving, by a base station in a wireless communications network, a setup request;
   performing an enabling handshaking between a node of the wireless communications network and the base station, wherein the wireless communications network connects at least one neighboring base station and the base station enabling a user device associated with the base station and/or the at least one neighboring base station to be able to be reassigned between the base station and the at least one neighboring base station;
   wherein said setup request is received via the at least one neighboring base station from the user device associated with the base station; and
   in response to successful completion of said enabling handshaking, enabling wireless transmission and wireless reception of the base station, wherein the base station is located in a coverage area of the at least one neighboring base station.

7. The method according to claim 6, wherein
   said setup request is received from a device trying to communicate with the user device.

8. The method of claim 6, wherein a wireless local area network access point serves a cell of the base station.

9. An apparatus comprising one or more processors and one or more memories including computer program code, the one or more memories and the computer program code configured, with the one or more processors to cause the apparatus to perform at least the following:
   transmitting and/or receiving a wireless communication signal;
   determining whether there is an active wireless communication data session, based on the transmitting and receiving of the base station, between said apparatus and a user device while the user device is assigned to the apparatus;
   in response to determining no active wireless communication data session between the apparatus and a user device while the user device is assigned to the apparatus, disabling said wireless transmitting and said wireless receiving while maintaining a connection between said apparatus and a node of the wireless communications network,
   wherein the determination of no active wireless data session comprises at least one of the user device having left the coverage area of the base station, the active wireless session has been terminated, and no traffic is transmitted over a predefined period,
   receiving, by the apparatus in the wireless communications network, a setup request,
   performing an enabling handshaking between said node of the wireless communications network and said apparatus, wherein the wireless communications network connects at least one neighboring base station and said apparatus enabling a user device associated with the apparatus and/or the at least one neighboring base station to be able to be reassigned between the apparatus and the at least one neighboring base station, and
   in response to successful completion of said enabling handshaking, enabling said wireless transmitting and said wireless receiving, wherein the base station is located in a coverage area of the at least one neighboring base station,
   wherein said setup request is received via the at least one neighboring base station from the user device associated with the apparatus.

10. The apparatus according to claim 9, wherein the one or more memories and the computer program code are further configured, with the one or more processors, to cause the apparatus to perform:
    implementing a disabling handshaking between said apparatus and the at least one neighboring base station.

11. The apparatus according to claim 10, wherein the one or more memories and the computer program code are further configured, with the one or more processors, to cause the apparatus to perform:

in response to successful completion of said disabling handshaking and/or said re-assignment, disabling said wireless transmitting and said wireless receiving.

12. The apparatus according to claim 9, wherein the one or more memories and the computer program code are further configured, with the one or more processors, to cause the apparatus to perform:
re-assigning at least one user device assigned to said apparatus to the at least one neighboring base station in a coverage area of which said apparatus is located.

13. The apparatus of claim 9, wherein a wireless local area network access point serves a cell of the apparatus.

14. An apparatus comprising one or more processors and one or more memories including computer program code, the one or more memories and the computer program code configured, with the one or more processors to cause the apparatus to perform at least the following:
receiving a setup request via a node of a wireless communications network;
performing an enabling handshaking between said node of the wireless communications network and the apparatus, wherein the wireless communications network connects at least one neighboring base station and the apparatus enabling a user device associated with the apparatus and/or the at least one neighboring base station to be able to be reassigned between the apparatus and the at least one neighboring base station;
wherein said setup request is received via the at least one neighboring base station from the user device associated with the apparatus; and
in response to successful completion of said enabling handshaking, enabling wireless transmission and wireless reception of the apparatus, wherein the apparatus is located in a coverage area of the at least one neighboring base station.

15. The apparatus according to claim 14, further comprising:
receiving said setup request from a user device associated with said apparatus.

16. The apparatus according to claim 14, further comprising:
receiving said setup request from a device trying to communicate with the user device.

17. The apparatus of claim 14, wherein a wireless local area network access point serves a cell of the apparatus.

18. A computer program product embodied on a non-transitory computer-readable medium storing a computer program that, when being executed by a computer, is configured to provide instructions to control or carry out:
in a wireless communication network wherein a base station is in communication with at least one node of the wireless communication network through a connection, determining whether there is an active wireless communication data session, based on wireless transmission and reception of the base station, between the base station and a user device while the user device is assigned to the base station;
in response to determining that there is no active wireless communication data session between the base station and the user device, disabling all wireless transmitting and wireless receiving of the base station while maintaining the connection between the base station and the at least one node of a wireless communication network, wherein the determination of no active wireless data session comprises at least one of the user device having left the coverage area of the base station, the active wireless session has been terminated, and no traffic is transmitted over a predefined period;
receiving a setup request through the connection to the at least one node of the wireless communication network,
performing an enabling handshaking between the base station and the at least one node of the wireless communication network, wherein the wireless communication network connects at last one neighboring base station and the base station to enable the user device assigned to the base station and/or the at least one neighboring base station to be reassigned between the base station and the at least one neighboring base station; and
in response to a successful completion of the enabling handshaking, enabling wireless transmitting and wireless receiving of the base station, wherein the base station is located in a coverage area of the at least one neighboring base station;
wherein said setup request is received via the at least one neighboring base station from the user device assigned to the base station.

* * * * *